UNITED STATES PATENT OFFICE.

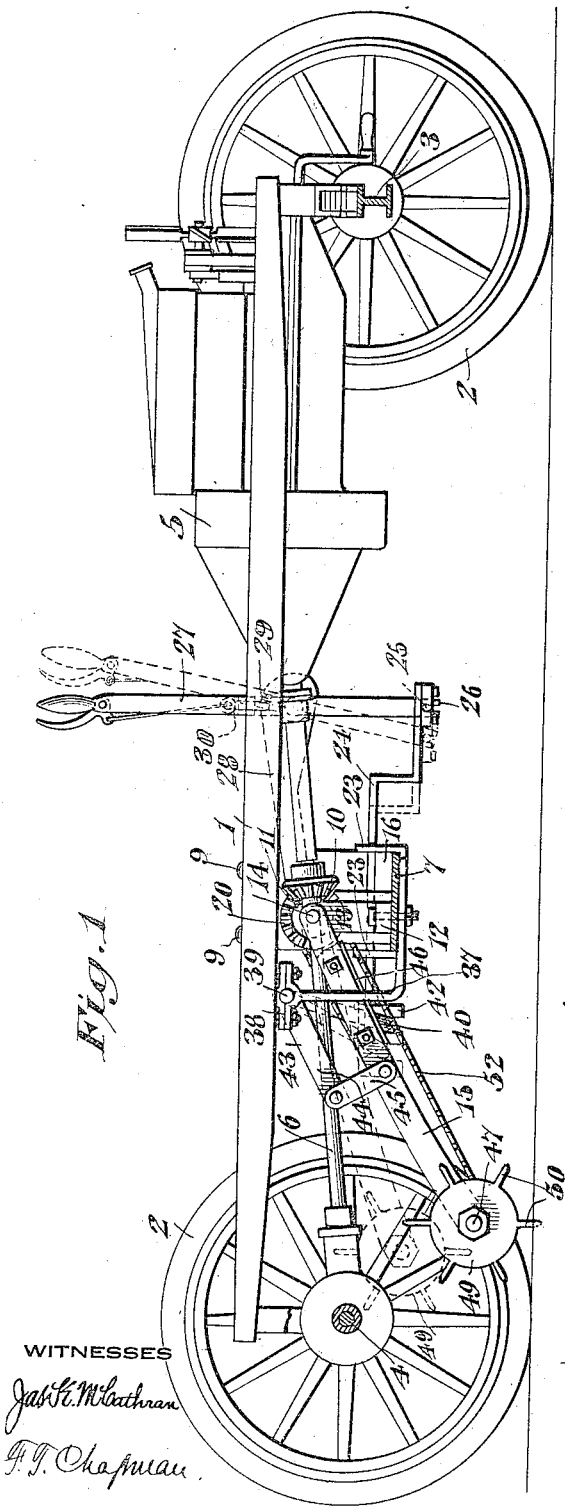

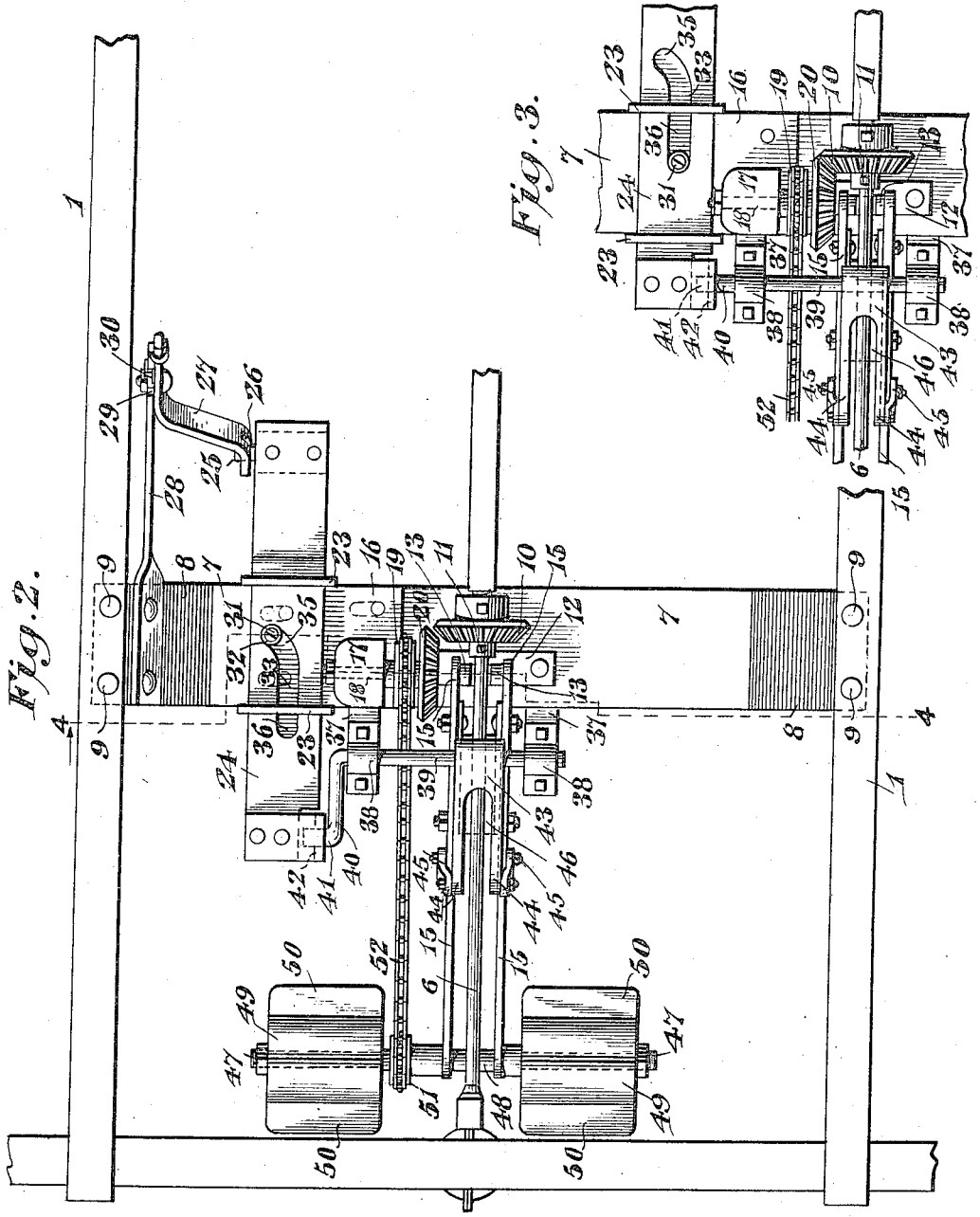

AREY V. WINEGARDEN, OF WICHITA, KANSAS, ASSIGNOR OF ONE-HALF TO PETER L. LAZARUS, OF WICHITA, KANSAS.

SUPPLEMENTAL TRACTION ATTACHMENT FOR VEHICLES.

1,252,871.  Specification of Letters Patent.  Patented Jan. 8, 1918.

Application filed October 5, 1916. Serial No. 123,956.

*To all whom it may concern:*

Be it known that I, AREY V. WINEGARDEN, a citizen of the United States, residing at Wichita, in the county of Sedgwick and State of Kansas, have invented a new and useful Supplemental Traction Attachment for Vehicles, of which the following is a specification.

This invention has reference to supplemental traction attachments for vehicles, being especially designed for use in connection with automobiles, and is useful in connection with other vehicles than those ordinarily known as automobiles, since the attachment may be used in connection with sleighs.

The object of the invention is to provide a device attachable to an automobile without change of the driving mechanism thereof, whereby extra tractive effect is obtainable to propel the vehicle out of a mud hole or along a slippery way or up a hill.

In accordance with the present invention there is provided power transmitting mechanism readily applied to the frame of an automobile and below the body thereof to an extent permitting the attachment to be applied to the vehicle without interference with any of the usual mechanism of the vehicle. The attachment is such that it may be coupled to or uncoupled from the drive shaft of the vehicle at will, the act of coupling the attachment to the drive shaft for tractive effect resulting in placing ground engaging devices in contact with the ground, so that a superior tractive effect is obtained causing the vehicle to move under conditions where the ordinary driving wheels would be ineffective.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is a longitudinal section of the chassis of an automobile showing the invention applied, with the propelling attachment in operative position to drive the vehicle.

Fig. 2 is a plan view of the structure of Fig. 1, omitting the front portion of the automobile chassis and showing the attachment in the inoperative position.

Fig. 3 is a plan view of a portion of the attachment showing it in the operative position.

Fig. 4 is a section on the line 4—4 of Fig. 2 with some parts in elevation.

Fig. 5 is a bottom plan view of a portion of the attachment.

Referring to the drawings there are shown side bars 1, wheels 2, front and rear axles 3 and 4, respectively, and engine 5 of an automobile, these parts being indicative of any suitable type of automobile, and, therefore, requiring no special description. The showing of the drawings with respect to the automobile is that of the Ford automobile, but it is to be understood that the invention is not limited to any particular make of automobile, or even to a wheeled vehicle, since the invention is easily applicable to a sleigh. The showing of the automobile also includes a power shaft 6 between the engine 5 and the rear axle 4.

Fast at the ends to the side bars 1 is a strap 7 serving as a support for certain parts to be described. The strap has rising end portions 8 which at the upper ends are secured by bolts 9 to the side bars of the frame, the structure being such that usually but two bolts are needed at each end of the strap and the only change required in the structure of the automobile for the application of the attachment is the boring of the holes for the bolts 9.

Secured upon the drive shaft 6 is a bevel gear 10, but as this bevel gear may be slipped upon the drive shaft without changing the structure of the latter and may be secured to the drive shaft by a set screw 11, or otherwise, the mounting of the gear wheel 10 on the shaft 6 requires no change whatever in the structure of the customary parts of the automobile. The strap 7 carries an upstanding bracket 12 terminating in upstanding arms 13 each of which carries a pin 14 serving as a pivot pin for the corresponding end of a link 15, which latter is long enough to extend to a point near the rear axle 4. The arms 13 in the particular showing of the drawings straddle the shaft 6, and, therefore, offer no obstruction thereto. Close to but in spaced relation to the bracket 12 the strap 7 carries a base plate 16 having an upstanding post 17 thereon near one end. The post carries a laterally extending spindle 18 projecting toward the shaft 6 and on the spindle there is mounted a sprocket wheel 19 and a bevel gear wheel 20. The pinion 19 and gear wheel 20 are fast together and the base plate 16 is movable so that the gear wheel 20 may be moved into and out of mesh with the gear wheel 10. The plate 16 is made fast to the strap 7 by stud bolts 21 extending through slots 22 in the strap, these slots being elongated in the direction of the length of the strap, which direction is transverse to the length of the automobile. The arrangement is such that the base plate 16 is held to the strap 7 but is movable in the direction of the length of the latter by mechanism to be described, so that the gear wheel 20 may be placed in mesh with or disconnected from the gear wheel 10.

On opposite sides of the strap 7 are rising ears 23 with passages therethrough for a bar 24 which in the particular showing of the drawings is a flat bar. At one end the bar 24 carries a pin 25 straddled by a fork 26 on one end of a hand lever 27 pivoted to a bracket 28 fast to and extending from the corresponding end portion of the strap 7. The bracket 28 has notches 29 therein for a thumb latch 30 carried by the hand lever 27, whereby the lever may be locked in more than one position. Rising from the plate 16 is a stud 31 with a roller 32 thereon lodged in an elongated slot 33 in the bar 24. This slot has a curved portion 35 at one end and a straight portion 36 at the other end, the straight portion extending lengthwise of the bar. The walls of the slot engaging the roller 32 impart to the plate 16 a movement in the direction of the length of the strap 7, that is, transversely of the vehicle, for a portion of the travel of the bar 24, and for the remainder of the travel of the bar the plate 16 is held against movement. The slot 33 is so shaped that when the bar 24 is moved in one direction the gear wheel 20 will be carried out of mesh with the gear wheel 10 and when the bar 24 is moved in the other direction the gear wheel 20 will be moved into mesh with the gear wheel 10, after which the bar may be moved lengthwise for a suitable distance.

The strap 7 carries brackets 37 so located as to be on opposite sides of the shaft 6 when the attachment is installed, and these brackets rise to a greater height than the shaft 6. The brackets 37 carry journal bearings 38 in which is mounted a rock shaft 39 having at one end a crank 40 with a free end 41 engaging in a fork 42 carried by the corresponding end of the bar 24. The fork is of sufficient length to allow the end 41 to move therein when the crank 40 is rocked by lengthwise movements of the bar 24.

Fast on the shaft 39 is a yoke 43 having leg portions 44 so positioned that they may straddle the shaft 6. The free ends of the legs 44 are connected to the respective links 15 by other links 45.

Those ends of the links 15 adjacent to the pins 14 are held together by a bridge plate 46 in non-interfering relation to the shaft 6 and serving to brace the links.

At the other or rear ends of the links they are traversed by a shaft 47 with the said ends of the links spaced apart by a spacer sleeve 48 or in any other suitable way. Fast on the shaft 47 near the ends thereof and outside of the links 15 are drums 49 each provided with a circular series of radial blades 50. At a suitable point on the shaft 47 there is secured a sprocket pinion 51 connected by a sprocket chain 52 to the sprocket wheel 19.

With the attachment applied to the automobile its normal position is the inoperative one, that is, the hand lever 27, which is located within easy reach of the driver, is normally so positioned that the bar 24 is moved rearwardly to its full extent. This means that the roller 32 is in the end 35 of the slot 36 and, therefore, the plate 16 and parts carried thereby are moved to the full extent toward the corresponding side of the vehicle. Under these conditions the gear wheel 20 is out of mesh with the gear wheel 10 and the crank shaft 19 has been rocked sufficiently to lift the leg end of the yoke 43, thus correspondingly moving the links 15 until the drums 49 with the blades or fins 50 have been raised to their fullest extent. In this position the drums are sufficiently elevated above the ground on which the vehicle travels to be wholly inoperative and out of the path of all ordinary obstructions, while the operating means for the drums are disconnected from the power shaft and hence do not move.

If, now, the vehicle should become lodged in a mud hole or be standing upon slippery ground or it should be desirable that assistance be had in propelling the vehicle up hill, the hand lever 27 is rocked to another position, thus moving the bar 24 until the walls of the slot 33 have caused a movement of the plate 16 to an extent bringing the gear wheels in mesh. This movement is sufficient to cause the lowering of the supplemental driving wheels made up of the drums 49 and blades 50, for the movement of the part 24 is continued because of the prolongation 36 of the slot 33. The supplemental driving devices or wheels are, therefore, set into motion and may be brought slowly into engagement with the ground and so gradually engage the ground, and thus as gradually propel the vehicle until the conditions are such that the vehicle is driven out of the mud hole, or is given an impetus upon slippery ground or is assisted up hill. Under all these conditions the ordinary propulsion of the vehicle by the customary wheels proceeds so that as soon as the unfavorable conditions are overcome the vehicle may travel ahead as usual when the supplemental propelling wheels may be lifted to the inactive position and stopped by a single movement of the hand lever 27.

It is usually only necessary to provide two notches 29, one for holding the hand lever in the forward position with the supplemental propelling wheels elevated and the other to hold it in the rearward position with the supplemental driving or propelling wheels lowered.

While the embodiment of the invention shown is a practical embodiment, it is quite apparent that it is susceptible of considerable change in various ways to adapt it to different types of vehicles, and to different conditions under which it may be used. It will be understood that the showing of the drawings is intended more particularly to show the principles upon which the invention is based than to illustrate any particular structure or those refinements which might be embodied therein by the constructing engineer. Since it is customary on vehicles to protect working parts from access of dust or dirt and to provide for suitable lubrication, it is to be understood that suitable guards and oiling devices are provided in the installed structure, but such showings have been omitted from the drawings as unnecessary for an understanding of the invention.

What is claimed is:—

1. In an automobile having a frame with side bars and a power shaft extending from the power unit to the driving wheels, a traction attachment comprising a support connected to and extending between the side bars of the frame, a driving member on the power shaft, a driven member mounted on the support to one side of the driving member and movable into and out of engagement therewith, manually operable means for moving the driven member into and out of engagement with the driving member, a pivoted carrier on the support having a pivotal axis traversing the power shaft, traction devices on the end of the pivoted carrier remote from its pivot support, driving connections between the driven member and the traction devices, and connections between the manipulating means and the pivoted carrier for causing the lowering and raising of the traction devices and the connecting and disconnecting of the drive and driven members simultaneously.

2. In an automobile provided with a main frame, a power unit thereon, a power shaft and drive wheels, a traction attachment comprising a support extending between the side bars of the main frame intermediate of the power unit and drive wheels and dipping below the power shaft, a gear wheel mounted on the power shaft, another gear wheel mounted on the support and provided with carrying means movable on the support laterally of the automobile to bring the second-named gear wheel into and out of mesh with the first-named gear wheel, a carrier having one end pivotally mounted on the support, traction devices at the other end of the carrier, and manipulating means having connections to the pivoted carrier and to the support for the second-named gear wheel for moving them simultaneously to lower the traction devices and mesh the gear wheels or to raise the traction devices and move the gear wheels out of engagement.

3. In an automobile having a main frame, a power unit and drive wheels mounted on the main frame, and a transmission or power shaft between the power unit and drive wheels, a traction attachment comprising a support extending between and connected to the side bars of the main frame between the power unit and the drive wheels, a carrier having a pivotal connection at one end to the support, traction devices on the other end of the carrier and located in advance of the driving wheels, a slidable member on the support mounted to move lengthwise of the latter, a gear wheel mounted on the slidable member and provided with connections to the traction devices, another gear wheel fixed on the transmission shaft and in the path of the first-named gear wheel, another slidable member connected to and movable transversely of the length of the first-named slidable member, connections between the second-named slidable member and the pivoted carrier, and manipulating means for second-named slidable member to cause simultaneous movement of the first-named gear wheel and of the pivoted carrier.

4. A traction attachment for motor vehicles, comprising rotatable traction devices, a pivoted carrier therefor, a slidable member, driving connection to the rotatable devices having a part mounted on the slidable member and movable thereby into and out of engagement with the power side of the motor vehicle, and connections between the slidable member and the carrier for the rotatable devices for raising and lowering the latter with and in timed relation to the coupling of the rotatable members to the power side of the vehicle and the uncoupling thereof from the power side of the vehicle, the attachment including a manipulating member for the slidable member, and said manipulating member including a reciprocable bar with pin and slot connections to the slidable member.

5. A traction attachment for motor vehicles comprising a support attachable to and removable from the vehicle, a gear wheel attachable to a rotatable part of the power unit of the motor vehicle, a slide on the support, a gear wheel carried on the slide and movable by the latter into and out of engagement with the first-named gear wheel, a reciprocable bar on the support, pin and slot connections between the bar and the slide to cause movements of the slide to bring the gear wheels into and out of engagement, the bar having a range of travel greater than that necessary to move the slide, means for the manipulation of the bar at will, a pivoted carrier on the support, traction devices on the carrier movable into and out of engagement with the ground on which the vehicle travels, and driving connections between the second named gear wheel and the traction devices.

6. A traction attachment for motor vehicles, comprising a support adapted to be attached to a vehicle, traction devices carried by the support, driving connections for the traction devices also carried by the support, means attachable to a portion of the power side of the vehicle for actuating the driving connections for the traction devices, and manipulating means on the support for moving the driving connections into and out of coupled relation with the power side of the vehicle and for moving the traction devices into and out of operative position by a continued movement of the manipulating means in one or another direction.

In testimony, that I claim the foregoing as my own, I have hereto affixed my signature in the presence of two witnesses.

AREY V. WINEGARDEN.

Witnesses:
J. L. BARR,
A. M. PAMMENTER.

Copies of this patent may be obtained for five cents each, by addressing the "Commissioner of Patents, Washington, D. C."